3,414,431
ANTI-STATIC CYCLIC IMIDE
ADDITION PRODUCTS
William J. Shibe, Jr., Riverton, N.J., and Marcus Sittenfield, Philadelphia, Pa., assignors to Hollichem Corporation, Camden, N.J., a corporation of New Jersey
No Drawing. Original application Mar. 20, 1962, Ser. No. 181,204, now Patent No. 3,223,711, dated Dec. 14, 1965. Divided and this application Aug. 18, 1965, Ser. No. 480,804
3 Claims. (Cl. 117—121)

ABSTRACT OF THE DISCLOSURE

An electrically non-conductive substance having anti-static properties which consists of the substance being either coated, blended or impregnated with the reaction product of a halo-amine and an aromatic cyclic imide wherein the halo-amine has the structure:

$$(R_3N)_n EX_{m-n}(n-1)X$$

where $m$ is an integer from 3 to 4 and $n$ is an integer from 1 to 4 when $m$ is 4 and is an integer from 1 to 3 when $m$ is 3, where at least one R attached to each nitrogen atom is attached thereto by means of a terminal carbon atom and is selected from the group consisting of alkyl, alkenyl, alkadienyl, hydroxyalkyl and alkyl benzyl, the straight chains of which have from 4 to 22 carbon atoms, and lower polyoxyalkylene having a total of 4 to 22 carbon atoms, any remaining R's being selected from the group consisting of hydrogen, alkyl groups having from 1 to 5 carbon atoms, phenyl and benzyl, where E is selected from the group consisting of zinc, copper, cobalt, magnesium, manganese, aluminum, boron and iron, and where X is a halide, the cyclic imide being a member of the group consisting of benzosulfimide, phthalimide, naphthalimide, benzoxazolinone, benzothiazolinone, and their lower alkyl, halo and methoxy analogs.

---

This application is a division of copending application Ser. No. 181,204, filed Mar. 20, 1962, now Patent No. 3,223,711.

This invention relates to novel biocidally-active products, and it particularly relates to products formed by the reaction of certain halo-amines and certain aromatic cyclic imides.

It has heretofore been found that those aromatic cyclic imides wherein the aromatic nucleus has attached thereto in those positions not attached to the cyclic imide radical a member of the group consisting of hydrogen, halogen, alkyl and alkoxy and wherein the cyclic imide radical has the formula NHCOY, where Y is a member of the group consisting of CO, O, S, SO₂ and N, are effectively combined with various quaternary ammoniums to provide products which have generally increased biocidal activity relative to previously known quaternaries. These quaternary ammonium cyclic imides were also found to be more compatible with detergents permitting their more effective use in detergent solutions. In addition, these products were found to provide substantial antistatic properties when incorporated in electrically non-conductive materials.

It has now been discovered that the same antistatic properties are provided and that even greater biocidal activity as well as a higher degree of compatibility with detergents are obtained by the products resulting from the reaction of the aforementioned aromatic cyclic imides with halo-amine complexes having the general formula:

$$[(R_3N)_n EX_{m-n}] \cdot (n-1)X$$

where $m$ is an integer from 3 to 4 and $n$ is an integer from 1 to 4 when $m$ is 4 and is an integer from 1 to 3 when $m$ is 3, where at least one R attached to each nitrogen atom is attached thereto by means of a terminal carbon atom and is selected from the group consisting of alkyl, alkenyl, alkadienyl, polyoxyalkylene, alkanol, cycloalkyl, alkyl aryl, alkenyl aryl and alkadienyl aryl radicals, the straight chain radicals or portions of radicals having from 4 to 22 carbon atoms in the chain and the remaining R's, if any, being selected from the group consisting of hydrogen, alkyl radicals having from 1 to 5 carbon atoms, cycloalkyl, phenyl and benzyl radicals, E being either a divalent element such as zinc, copper, cobalt, magnesium and manganese, or a trivalent element such as aluminum, boron or iron, X being a halide selected from the group consisting of chlorine, bromine, fluorine and iodine.

Among the halo-amines of the above type suitable as reactants for the instant purpose are saturated amines such as butylamine, isobutylamine, hexylamine, octylamine, nonylamine, decylamine, laurylamine, myristylamine, cetylamine, stearylamine, arachidylamine, behenylamine, lauryl benzyl amine, lauryl benzyl dimethyl amine, 2-alkyl imidazoline, octyl phenoxyethoxyethyl amine, octyl phenoxyethoxyethyl dimethyl amine, octyl methylphenoxyethoxyethyl amine, lauryl methyl benzyl amine, stearyl benzyl amine, behenyl benzyl amine, etc.

Some halo-amine compounds of the above type and their methods of preparation have been heretofore disclosed in U.S. Patent No. 2,655,524, dated October 13, 1953. That patent disclosed the preparation of halo-amine compounds where at least one R was selected only from the alkyl, alkenyl and alkadienyl radicals, where $m$ had only a value of 4, and where E was selected only from the group consisting of aluminum and boron.

The present invention utilizes not only the specific compounds disclosed in the aforementioned patent but also utilizes compounds of such type where E may be other trivalent elements such as iron as well as compounds where E is a divalent element such as zinc, copper, cobalt, magnesium or manganese.

The preparation of halo-amine compounds of the present type where E is either aluminum or boron has been adequately disclosed in the aforementioned Patent No. 2,655,524 and the same type of preparation may be used where E is another trivalent element such as iron. This preparation generally comprises a simple contacting of the amine with the halide, the reaction taking place with or without the use of an inert solvent such as benzene, toluene, ether, ethyl acetate, dioxane, etc., the only essential differences in the preparation of the various types being a variation in the amounts of the ingredients to conform to variations in the molecular weights of the elements E.

The compounds where E is divalent are prepared in much the same manner as where E is trivalent. This is illustrated by Example 1 as follows:

Example 1

13.7 gms. of anhydrous zinc chloride were dissolved in 250 mm. of toluene. Any water that might have been present in the zinc chloride was removed by azeotropic distillation. To this zinc chloride-toluene mixture was then slowly added, with agitation, 55.5 gms. of lauryl amine dissolved in 500 mm. of toluene.

After all the amine was added, the mixture was refluxed for 1 hour. The reaction mass was then allowed to cool to room temperature while being agitated. The resulting toluene suspension was then filtered and the residue remaining was identified as trilauryl amino zinc chloride.

The preparation of other like compounds were E is divalent, such as copper, cobalt, magnesium and manganese, may be attained in the same manner except that the specific amounts used will vary with the varying molecular weights of the different materials used in the preparations.

The preparations of the halo-amine cyclic imides within the scope of the present invention are generally the same for all such products, any differences mainly lying in the choice of solvents and the use of varying amounts of ingredients to correspond to varying molecular weights. The following examples are illustrative of the procedures used:

Example 2

24 gms. of tetrakis lauryl amino boronium chloride were dissolved in 500 gms. of ethyl alcohol. 24 gms. of sodium benzosulfimide (sodium saccharinate) were dissolved in 500 gms. of ethyl alcohol. The two solutions were then mixed and the resultant salt was removed by distillation under reduced pressure. The remaining white solid was identified as tetrakis lauryl amino boronium benzosulfimide.

Example 3

69 gms. of trilauryl amino zinc chloride were dissolved in 1 liter of hot water (200° F.). 48 gms. of sodium benzosulfimide solution was then added, with vigorous agitation, to the hot zinc amine solution. The resultant mixture was then allowed to cool to room temperature while maintaining agitation thereof. The agitation was then halted and the mixture was allowed to remain standing for 1 hour. An oily mixture settled at the bottom and was removed and washed with 500 gms. of deionized water. The oily layer was then again separated and placed in a vacuum oven to dry at 200° F. The resultant product was identified as trilauryl amino zinc benzosulfimide.

Example 4

17 gms. of copper chloride were dissolved in 1000 gms. of hot benzene (150° F.). To this solution was slowly added, accompanied by agitation and cooling, 55.5 gms. of lauryl amine disolved in 1000 ml. benzene. A light blue precipitate resulted. This precipitate was filtered off and upon evaporation of the benzene, a dark blue product was obtained. Although the light blue precipitate was insoluble in benzene, alcohol or water, the dark blue product, a crystalline material, proved to be soluble in water, isopropyl alcohol and benzene. The dark blue product was identified as being trikis lauryl amino cupric chloride.

6.2 gms. of above-obtained trikis lauryl amino cupric chloride were dissolved in 500 gms. of isopropyl alcohol. 2 gms. of sodium benzosulfimide were dissolved in 25 gms. of hot (85° C.) isopropyl alcohol. The two solutions were then mixed together and evaporated to dryness. It was then taken up with isopropyl alcohol and the salt was filtered off. The resultant blueish precipitate had a sweet taste and was slightly soluble in water and alcohol. It was identified as trikis lauryl amino cupric benzosulfimide.

Example 5

12.5 gms. of manganese chloride were dissolved in 500 gms. of isopropyl alcohol. 97.5 gms. behenyl amine were dissolved in 500 gms. isopropyl alcohol. The two solutions were then blended together, accompanied by agitation, and heated to reflux for one-half hour. The alcohol was evaporated under reduced pressure and the resultant product was identified as trikis behenyl amino manganese chloride.

11 gms. of the above-obtained trikis behenyl amino manganese chloride were dissolved in 500 gms. of hot (85° C.) isopropyl alcohol. 6.34 gms. sodium tetrachloro phthalimide were dissolved in 500 gms. hot (85° C.) isopropyl alcohol. The two solutions were then mixed, with agitation, at room temperature. The resultant NaCl was filtered off and the mixture was evaporated to dryness. The resultant product was identified as trikis behenyl amino manganese tetrachloro phthalimide.

Example 6

102 gms. of 5,6-dichlorobenzoxazolinone were dissolved in 1 l. of 99% isopropanol. 198 gms. tetrakis stearyl amino boronium chloride were dissolved in 1 l. hot (85° C.) 99% isopropyl alcohol. The two solutions were then mixed and allowed to reach room temperature. The resultant salt was removed by filtration and the alcohol was removed by evaporation under reduced pressure. The resultant product was identified as tetrakis stearyl amino boronium 5,6-dichlorobenzoxazolinone.

Example 7

51.6 gms. octyl amine were dissolved in 500 gms. benzene, 13.3 gms. aluminum chloride were dissolved in 500 gms. benzene. The two solutions were mixed, under agitation, and heated to reflux. The mixture was held at reflux temperature for 30 minutes. The mixture was then allowed to come to room temperature and the resultant solid material was removed by filtration. This material was identified as tetrakis octyl amino aluminum chloride.

16.2 gms. of the above-obtained tetrakis octyl amino aluminum chloride were dissolved in hot (85° C.) 99% isopropyl alcohol. 18 gms. of 5-methoxybenzothiazolinone were dissolved in 500 gms. hot (85° C.) 99% isopropyl alcohol. The two solutions were mixed at room temperature and 44 gms. of sodium hydroxide dissolved in 500 gms. of isopropyl alcohol were added while the mixture was under agitation. The resultant precipitate was removed by filtration and the filtrate evaporated to dryness under reduced pressure. The resultant product was identified as tetrakis octyl amino aluminum 3-methoxybenzothiazolinone.

Example 8

82.5 gms. of lauryl benzyl amine were dissolved in 500 gms. of 99% isopropyl alcohol. 13.6 gms. of zinc chloride were dissolved in 500 gms. benzene. The two solutions were then mixed together under agitation, and heated to reflux. The mixture was held at the reflux temperature for 30 minutes and then allowed to cool to room temperature, after which it was filtered with the resultant precipitate being identified as trikis lauryl benzyl amino zinc chloride.

48 gms. of the above-obtained trikis lauryl benzyl amino zinc chloride were dissolved in 1 liter of hot (85° C.) isopropyl alcohol. 16.1 gms. of 6-methylphthalimide were dissolved in 500 gms. hot (85° C.) 99% isopropyl alcohol. The two solutions were then blended and 5 gms. of sodium hydroxide, dissolved in 500 gms. of hot (85° C.) 99% isopropyl alcohol, were then added. The resultant mixture was then cooled to room temperature and the alcohol was removed under reduced pressure. The residue was identified as trikis lauryl benzyl amino zinc 6-methylphthalimide.

Among other aromatic cyclic imides which may be used are naphthalimide, benzothiazolinone, etc.

All of the halo-amine aromatic cyclic imides within the scope of the present invention may be reacted with halogens to form halo complexes which not only have all the advantageous properties of the halo-amine cyclic imides by themselves but which also retain all the highly effective germicidal properties of the halogens while being free of such undesirable halogen properties as relatively high toxicity, irritability to skin, tendency to stain skin and fabrics, etc. Furthermore, these complexes, although cationic, may be used in admixture with an ordinary anionic surface-active agent while retaining the biocidal activity of the complex, especially against gram positive organisms, and while retaining the detergent activity of the surface active agent. The following is an example of the preparation of a halogen complex embodying the present invention.

Example 9

28 gms. of tetrakis myristyl amino boronium chloride were dissolved in 500 gms. of ethyl alcohol. 5 gms. of bromine were added, with agitation, and at a temperature of 140°–160° F., until all the bromine was dissolved. 24 gms. of sodium benzosulfimide were then dissolved in water and the resultant aqueous solution was added to the brominated alcohol solution of the tetrakis myristyl amino boronium chloride. The resultant oily layer which settled on the bottom was separated in a separatory funnel, washed with water to remove the residual salt, and dried under vacuum. The resultant pale yellow solid material was identified as tetrakis myristyl amino boronium benzosulfimide-bromine complex containing 10% by weight bromine.

The use of polyoxyalkylenamines in the preparation of compounds within the scope of the present invention is illustrated in the following example:

Example 10

11.7 gms. of boron trichloride were dissolved in 1 liter of chilled (20° C.) benzene. 200 gms. of polyoxyethylenamine were dissolved in 500 gms. benzene. The polyoxyethylenamine solution was then added slowly, accompanied by agitation, to the boron trichloride solution. During this addition of the one solution to the other, the temperature of the mixture was maintained at about 20° C. The mixture was then refluxed for 30 minutes, after which the benzene was removed under reduced pressure. The resultant amber-colored, oily-like material was identified as tetrakis polyoxyethylene amino boronium chloride.

7 gms. of the above obtained tetrakis polyoxyethylene amino boronium chloride were dissolved in 500 gms. of 99% isopropyl alcohol. 2.4 gms. of sodium benzosulfimide were dissolved in 500 gms. of hot (85° C.) 99% isopropyl alcohol. The two solutions were then mixed together and the mixture was reduced by vacuum distillation to about 100 cc. The mixture was then allowed to come to room temperature and the resultant salt was removed by filtration. The remainder of the alcohol and water was then removed in vacuum. The resultant material was identified as tetrakis polyoxyethylene amino boronium benzo sulfimide.

The products within the scope of the present invention have been found to be extremely effective as astringents. In addition they are very effective cleaning agents for glass, surface tiles, etc. whereby they not only act to remove dust, dirt and grime, but also provide a thin film or coating which, with its inherent antistatic properties, maintains the surface in a clean condition for longer periods of time than would otherwise be possible.

In some of their forms, as for example in the form of benzosulfimides, the present products are sweet and pleasant-tasting and are, therefore, very useful for mouthwashes and the like.

It has also been found that products within the scope of the present invention are active against many microorganisms such as bacteria, so that they can be effectively used for sterilizing and purifying purposes in swimming pools, reservoirs, and the like.

Illustrative of the biocidal activities of the present type products, a mixture containing 1% by weight tetrakis lauryl amino boronium benzosulfimide in an aqueous soap solution, wherein the soap comprised 12% by weight of the solution, gave 1 mm. zones of inhibition against *Staphylococcus aueus* (209) and *Staphylococcus aureus* (antibiotic-resistant strain). A 10% by weight aqueous solution of tetrakis lauryl amino boronium benzosulfimide, with no soap present in the solution, gave zones of inhibition of 5 mm. against *Staphylococcus aureus* (209), 3 mm. against *Staphylococcus aureus* (antibiotic-resistant strain), 5 mm. against *S. typhosi* and 5 mm. against *E. coli*. A 1% by weight aqueous solution of tetrakis lauryl amino boronium benzosulfimide, with no soap present, gave zones of inhibition of 3.5 mm. against *Staphylococcus aureus* (209), 2 mm. against *Staphylococcus aureus* (antibiotic-resistant strain), 3 mm. against *S. typhosi* and 3 mm. against *E. coli*. A 0.1% by weight aqueous solution of tetrakis lauryl amino boronium benzosulfimide, with no soap present, gave zones of inhibition of 1 mm. against *Staphylococcus aureus* (209), 0.5 mm. against *Staphylococcus aureus* (antibiotic-resistant strain), 0.5 mm. against *S. typhosi* and 0.5 mm. against *E. coli*.

An aqueous solution of 5% by weight sodium lauryl sulfate and 1% by weight tetrakis lauryl amino boronium benzosulfimide gave zones of inhibition of 5 mm. against *Staphylococcus aureus* (209) and 4 mm. against *Staphylococcus aureus* (antibiotic-resistant strain). An aqueous solution of 5% by weight sodium lauryl sulfate and 0.1% of tetrakis lauryl amino boronium benzosulfimide gave zones of inhibition of 1 mm. against *Staphylococcus aureus* (209) and 0.5 mm. against *Staphylococcus aureus* (antibiotic-resistant strain).

Halogen complexes within the scope of the present invention are even more active in that lower concentrations may be effectively used. For example, an aqueous solution of 25% by weight tetrakis lauryl amino boronium benzosulfimide-bromine complex, wherein 10% by weight of the complex consisted of bromine, gave zones of inhibition of 4 mm. against *Staphylococcus aureus* (209) and 5 mm. against *S. typhosi*. An aqueous solution containing 2.5% by weight of the same complex gave zones of inhibition of 2 mm. against *Staphylococcus aureus* (209) and 2 mm. against *S. typhosi*. At a concentration of 0.25% by weight of the same complex in the solution, the zones of inhibition were 1 mm. against *Staphylococcus aureus* (209) and 1 mm. against *S. typhosi*. At a concentration of 0.025% by weight of the same complex, the zones of inhibition were 0.5 mm. against *Staphylococcus aureus* (209) and 0.5 mm. *S. typhosi*.

An example of a detergent solution illustrating the compatibility of products of the present type with organic anionic detergents comprises the following liquid wash solution:

| Component: | Percent by wt. |
|---|---|
| Potassium tripolyphosphate | 19.5 |
| Sodium tripolyphosphate | 5.0 |
| "Ultrawet 60L" (alkyl aryl sulfonate anionic detergent produced by Atlantic Ref. Co., Phila., Pa.) | 33.0 |
| "Onyxol 336" (lauryic acid alkanolamine condensate; a liquid detergent produced by Onyx Oil & Chem. Co., Jersey City, N.J.) | 5.0 |
| Carboxyl methyl cellulose | 0.5 |
| Tetrakis lauryl amino boronium benzosulfimide-bromine complex (10% by weight bromine) | 1.0 |

The above components were admixed with constant agitation and at ambient temperature and pressure. This composition showed both good biocidal and good detergent activity when used on textiles in a conventional household clothes-washing machine.

The biocidal effectiveness of the present type of product, when used in a soap solution, is exemplified by the following composition:

| Component: | Percent by wt. |
|---|---|
| Coconut fatty acid | 10.1 |
| Potassium hydroxide solution (45% aqueous solution) | 5.0 |
| Tetrasodium ethylenediamine tetraacetate solution (20% aqueous solution) | 5.0 |
| Tetrakis lauryl amino boronium benzosulfimide | 1.0 |
| Water | 78.9 |

The above composition is prepared by mixing the fatty acid and the potassium hydroxide solution and heating the mixture to 200° F. The tetrasodium ethylenediamine tetraacetate, utilized as a sequestering agent, is then added to the mix, followed by the addition of, first, the water, and then, the tetrakis lauryl amino boronium benzosulfimide. The ingredients are thoroughly intermixed and then the mixture is cooled to room temperature.

In biocidal tests, the above soap solution gave a halo of 5 mm. against *Staphylococcus aureus* (209), 4 mm. against *Staphylococcus aureus* (antibiotic-resistant strain), 2 mm. against *E. coli* and 2 mm. against *S. typhosi*.

As previously indicated herein, the present products are very effective antistatic agents when physically combined with non-conductive substances such as paper, textiles, skins, leathers, furs, plastics, etc. They may be incorporated in waxes and polishes for furniture, automobiles, floors, walls and the like. These waxes and polishes, when applied to the surfaces to be treated, prevent the accumulation of dust, dirt, grime, etc. which would otherwise occur as the result of static electricity on such surfaces. Furthermore, these products are substantive to all of the aforementioned materials while their compatibility with polymeric substances such as epoxy resins, phenolics, acrylates, cellulose esters, polyolefins, polyurethanes, polyvinyls, polyamides, etc. make them ideal for blending with, impregnating or coating such materials. The terminology "physically combined," as used herein, therefore, includes blending, impregnating and coating.

Obviously many modifications and variations of the present invention are possible in the light of the above teachings. It is, therefore, to be understood that within the scope of the appended claims, the invention may be practiced otherwise than as specifically described.

The invention claimed is:

1. An electrically nonconductive substance selected from the group consisting of paper, textiles, skins, leathers, furs, plastics and waxes in physical combination with an antistatically effective amount of an antistatic agent, said agent being combined with said substance in such manner that an antistatically effective amount of the agent is present in that portion of the substance with which it is directly combined, said agent being the reaction product of a halo-amine and an aromatic cyclic imide wherein the halo-amine has the structure:

$$(R_3N)_n EX_{m-n}(n-1)X$$

where $m$ is an integer from 3 to 4 and $n$ is an integer from 1 to 4 when $m$ is 4 and is an integer from 1 to 3 when $m$ is 3, where at least one R attached to each nitrogen atom is attached thereto by means of a terminal carbon atom and is selected from the group consisting of alkyl, alkenyl, alkadienyl, hydroxyalkyl and alkyl benzyl, the straight chains of which have from 4 to 22 carbon atoms, and lower polyoxyalkylene having a total of 4 to 22 carbon atoms, any remaining R's being selected from the group consisting of hydrogen, alkyl groups having from 1 to 5 carbon atoms, phenyl and benzyl, where E is selected from the group consisting of zinc, copper, cobalt, magnesium, manganese, aluminum, boron and iron, and where X is a halide, the cyclic imide being a member of the group consisting of benzosulfimide, phthalimide, naphthalimide, benzoxazolinone, benzothiazolinone, and their lower alkyl, halo and methoxy analogs.

2. The product of claim 1 wherein the non-conductive substance is impregnated with said antistatic agent.

3. The product of claim 1 wherein the non-conductive substance is coated with said antistatic agent.

References Cited

UNITED STATES PATENTS 3,164,481  1/1965  Shibe _____ 117—139.5 X
2,655,524  10/1953  Sowa _____ 260—448

HERBERT B. GUYNN, *Primary Examiner.*